United States Patent [19]

Imamura

[11] 4,023,430
[45] May 17, 1977

[54] IMPACT ABSORBING, OVERLOAD PROTECTION APPARATUS FOR MACHINE TOOL

[75] Inventor: Yoshiaki Imamura, Hiroshima, Japan

[73] Assignee: Mitsubishi Jukogyo Kabushiki Kaisha, Tokyo, Japan

[22] Filed: Nov. 7, 1975

[21] Appl. No.: 629,926

[30] Foreign Application Priority Data

Nov. 14, 1974 Japan .................. 49-138020[U]

[52] U.S. Cl. ...................... 74/412 TA; 74/409;
74/425; 192/143; 74/410; 74/427; 192/150
[51] Int. Cl.² ................. F16H 1/02; F16H 35/10
[58] Field of Search .......... 74/412 TA, 412 R, 409,
74/410, 425; 192/143

[56] References Cited

UNITED STATES PATENTS

| 1,417,349 | 5/1923 | Ringer | 74/412 R |
| 1,437,017 | 11/1922 | Roberts | 74/412 TA |
| 2,586,293 | 2/1952 | Birkigt | 74/425 |
| 3,179,015 | 4/1965 | Kurt | 74/409 |
| 3,339,426 | 9/1967 | Borggrafe | 74/412 TA |

Primary Examiner—Samuel Scott
Assistant Examiner—Randall Heald
Attorney, Agent, or Firm—Watts, Hoffmann, Fisher & Heinke Co.

[57] ABSTRACT

An impact absorbing device for protecting a rotatable member of a motor powered machine tool feed mechanism from excessive impact and overload is disclosed. The device includes structure forming a flanged piston concentrically mounted with respect to the rotatable member and axially slidable within a housing in response to axial displacement of the rotatable member, (which is undesirable and thrust and radial bearing structure in which the rotatable member is journaled for rotative displacement. The housing and the flanged piston combine to define a pressure chamber whose volume varies as a function of the axial position of the piston. The pressure chamber is connected to a source of fluid under pressure, to cause the piston to yieldingly resist axial displacement of the rotatable member with respect to the housing. Also disclosed is apparatus connected to the rotatable member for interrupting the application of power to the rotatable member in response to a predetermined degree of axial displacement of the rotatable member.

5 Claims, 3 Drawing Figures

IMPACT ABSORBING, OVERLOAD PROTECTION APPARATUS FOR MACHINE TOOL

BACKGROUND OF THE INVENTION

1. Field of the Invention

This invention relates to the field of machine tools, and particularly to impact absorbing apparatus for protecting rotary mechanism of machine tools from damage due to overload or sudden impact.

2. Description of the Prior Art

Machine tools commonly incorporate rotary drive or feed mechanism for moving the workpiece relative to a cutting tool. Sometimes, due to the irregularity of configuration or inhomogeneity of the workpiece, substantial impacts and force nonuniformities are brought to bear on the rotary structure of the machine tool, or such forces may be generated by the inadvertent impacting of the workpiece on a stationary obstacle in its path of motion. These forces have been known to damage the machine tool.

More specifically, and referring to FIG. 1, a prior art rotary feed mechanism for a machine tool is shown. A feed shaft 1 is journaled in a radial bearing 2 and a thrust bearing 3, while power from a motor (not shown) is transmitted to the rotary feed shaft by way of a reduction gear 4. A work 5 and a worm wheel 6 respond to the rotation of the feed shaft to impart rotational motion to a portion of the machine tool (not shown) such as a worktable for feeding and rotating a workpiece.

In accordance with this arrangement, when an impact or overload is encountered between the workpiece and the cutting tool, a great deal of force is applied between the teeth of the worm wheel and the worm, and great forces are generated tending to displace the feed shaft in a longitudinal direction. Such forces can result in the breakdown of the bearings holding the feed shaft, or in the gearing constituting the drive between the motor and the worktable.

Some forms of protective apparatus for preventing this damage have been proposed, but none have been as effective as is desired. Previously, structure has been proposed for sensing the buildup of forces in various mechanisms of the machine tool, and for deactuating the power source of the machine tool to prevent damage from overloading or impact.

More recently, however, larger machine tools have been provided, capable of performing work on larger sized workpieces. The greater size of the machine tools and their workpieces has given rise to increased forces generated by overload and impacts than were previously the case. These increased forces, and the corresponding increase in their tendency to damage the machine tool, have elicited a desire for additional apparatus to protect the machine tool from damage resultant on these forces and impacts. Such impacts can result in the failure of the rotary feed mechanism itself, or in breakage of the cutting tool.

SUMMARY OF THE INVENTION

It is accordingly a principal object of the present invention to provide overload protective apparatus for use in a rotary mechanism of a machine tool.

It is another object of the present invention to provide overload protective apparatus for use in a rotary feed mechanism of a machine tool which has increased capability to protect the feed mechanisms even of larger and more powerful machine tools more recently manufactured.

It is a further object of the present invention to provide an overload protective device of the kind described, which absorbs impacts exerted on a feed shaft of the rotary feed mechanism.

It is a still further object of the present invention to provide an overload protective device of the kind described, which operates to stop application of power to the feed mechanism in response to an impact on the feed shaft.

According to the present invention, there is provided an impact absorbing, overload protective device for use in a rotary feed mechanism of a machine tool which comprises: a piston concentrically mounted around a rotatable member of the mechanism, mounted slidably within a housing for axial movement in response to axial forces on the rotatable member, the piston consisting of a sleeve formed with a flange portion, and bearing structure on which the rotatable member is journaled, with a chamber defined by at least the outer circumferential surface of the piston and and the inner circumferential surface of the housing whose volume varies with the axial position of the piston whereby when the rotatable member becomes axially displaced with respect to the housing, the device absorbs longitudinally directed forces exerted thereon as a result of impacts and overloads. The embodiment of the invention also includes a power interrupting mechanism including a rod which is in engagement with the rotatable member, whereby longitudinal displacement of the member may be transmitted through the rod to a limit switch, to stop a motor driving the rotary feed mechanism.

DESCRIPTION OF THE PREFERRED EMBODIMENT

These and other objects and features of the invention will be apparent from a reading of the following part of the specification in conjunction with the accompanying drawings which illustrate an embodiment of the invention.

Figure 1:
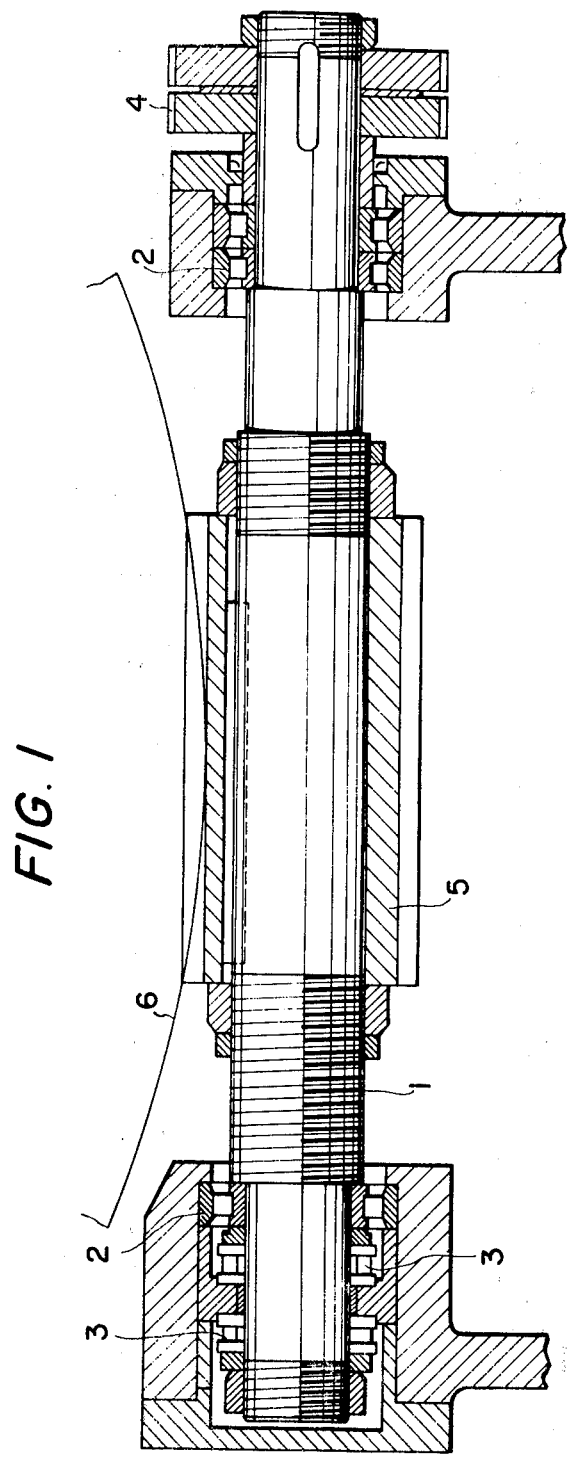
FIG. 1 is a longitudinal cross-sectional view of a prior art rotary feed mechanism including a feed shaft.
Figure 2:
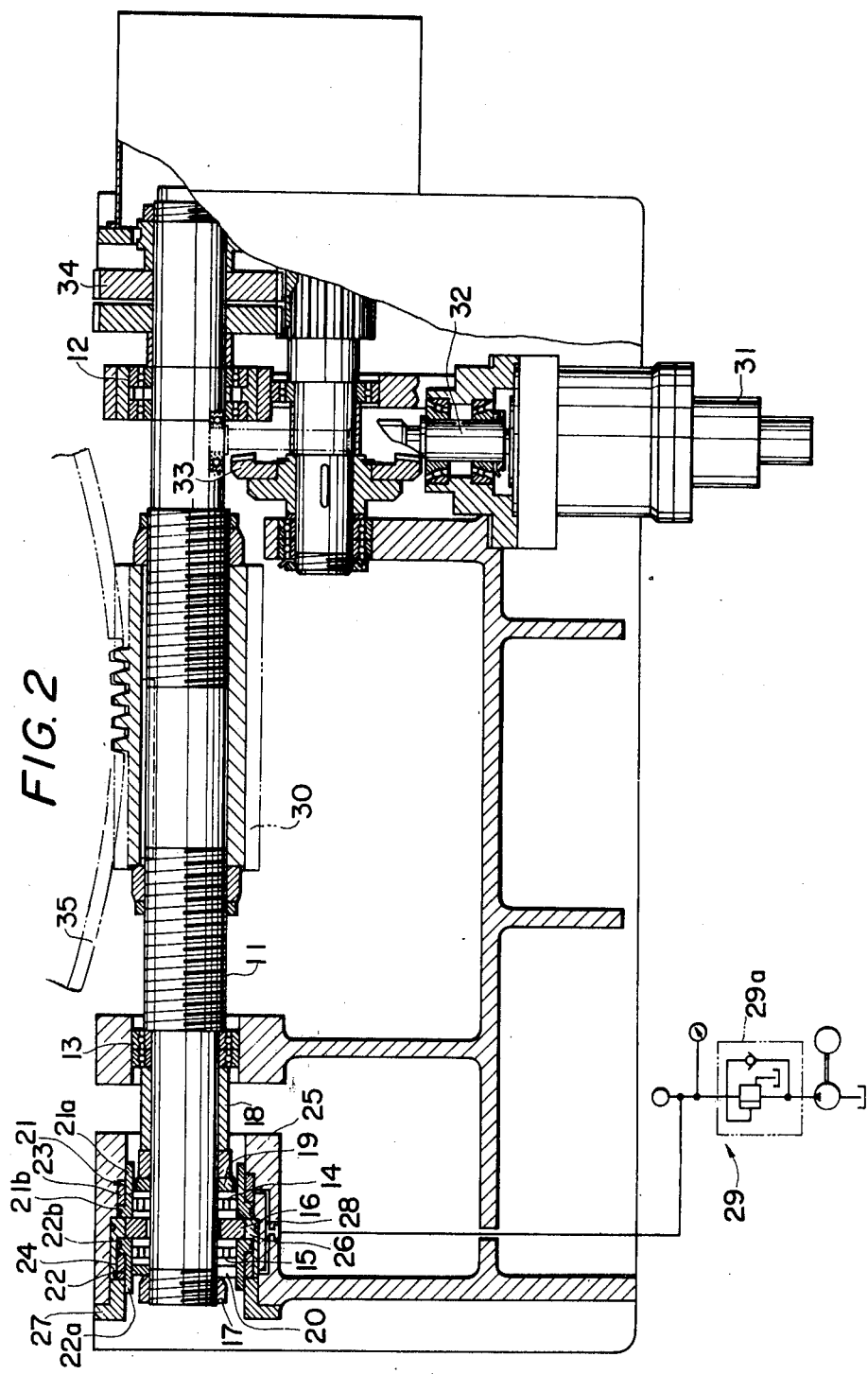
FIG. 2 is a longitudinal cross-sectional view of the rotary feed mechanism embodying the present invention; and, FIG. 3 is an enlarged cross-sectional view of a radial bearing shown in FIG. 2, taken along a line normal to the surface of FIG. 2.

Referring now to FIG. 2, a feed shaft rotatable member of a machine tool 11 is supported in a radial bearing 12, a radial bearing 13, a thrust bearing 14 and a thrust bearing 15, respectively. Interposed between the thrust bearings 14, 15 is a thrust washer 16 having a diameter somewhat larger than those of the bearings 14, 15. Threaded on the end portion of the feed shaft 11 is a nut 17 adapted to establish the longitudinal position of the feed shaft 11. A sleeve 18, a spacer 19, and a spacer 20 aid in supplementing the setting of the shaft 11 by means of the nut 17.

A piston 21 in concentric relation around the shaft, consists of a sleeve 21a formed with a flange portion 21b. The flange portion 21b of the piston 21 is so designed as to abut one surface of the thrust washer 16, while a thrust bearing 14 is fitted in the aforesaid flange portion 21b. In addition, the outer circumferential surface of the flange portion 21b and the end portion of the sleeve 21a are maintained in contact with the inner circumferential surface of a generally cylindrical housing 25, so that the piston 21 may be a longitudinally slidably displaced within the housing 25. In other words, the feed shaft 11 may be axially displaced to the right as viewed in FIG. 2.

A pressure chamber 23 is defined between the outer circumferential surface of the sleeve 21a and the inner circumferential surface of the housing 25 and communicates by way of a hydraulic pressure bath 28 with a hydraulic pressure system 29.

A piston 22 is a shape identical to that of the piston 21 and has a thrust bearing 15 fitted therein, with a flange portion 22b of the piston 21 in abutment with the other surface of the aforesaid thrust washer 16. In other words, the piston 21 is a symmetric to the piston 22 with respect to the axis of the thrust washer 16. The piston 22 is fitted in a cylinder 26 and may slidingly move axially within the cylinder 26 to the left, as viewed in FIG. 2.

In other words, the piston 22 supports the feed shaft 11, coupled with the aforesaid 21, in a manner that the shaft 11 may move axially or longitudinally. The cylinder 26 is fitted in the housing 25 and secured in position to the body proper 25 by means of a cover 37.

A pressure chamber 24 is defined by the outer circumferential surface of the sleeve 22a, the inner circumferential surface of the cylinder 26 and the inner edge of the cover 27. Like the hydraulic pressure chamber 23, the hydraulic pressure chamber 24 communicates by way of the hydraulic pressure path 28 to the hydraulic pressure system 29.

The hydraulic pressure system 29 is of a known type and supplies oil under pressure to the hydraulic pressure chambers 23, 24. In addition, the hydraulic pressure system 29 is provided with a relief valve 29a which maintains the pressure in the hydraulic pressure chambers 23, 24 at a given level.

A worm 30 is fitted on the feed shaft 11, and the worm 30 transmits a power to a worm wheel which is in engagement therewith, the aforesaid power being transmitted from a pulse motor 31, by way of a drive shaft 32, bevel gear 33, and reduction gear 34, to the aforesaid feed shaft. Thus, the worm wheel 35 may feed or rotate a workpiece mounted on a worktable.

Additionally, there is provided, in association with the radial bearing 12, means for stopping the pulse motor 31, in the event that, due to an impact acting on the feed shaft 11, the feed shaft 11 is displaced along the length thereof for a predetermined distance. More specifically, referring to FIG. 3, a rod 36 is formed with a conical-shaped end, which is fitted into a groove 37a having a V-shaped cross-section, which is defined in the circumferential surface of a bearing housing 37 for the radial bearing 12. In this respect, the aforesaid rod 36 is urged in the aforesaid condition under the action of a spring 38. In addition, a dog 39 is rigidly fitted on the other end portion of the rod 36 and adapted to abut a limit switch 40 due to the descending motion of the rod 36. The limit switch is electrically connected to the pulse motor 31.

In the event that there takes place a sudden stoppage in the rotary feed mechanism having the overload protective device of the aforesaid arrangement, or that a workpiece contacts or impinges on an obstacle around the workpiece mounted on a table, then an impact is transmitted by way of the work wheel 35 and worm 30 to the feed shaft 11. In the event that the aforesaid impact exerts axial forces on the feed shaft of the left as viewed in FIG. 2, then the forces of the impact are transmitted by way of the thrust washer 16 to the piston 22 so that the impact may be absorbed by the pressurized oil in the hydraulic pressure chamber 24. Likewise, in the event of an impact acting on the shaft 11 to the right as viewed in FIG. 2, then the impact is transmitted by way of the thrust washer 16 to the piston 21, so that the impact may be absorbed by pressure oil filled in the hydraulic pressure chamber 23.

Figure 3:
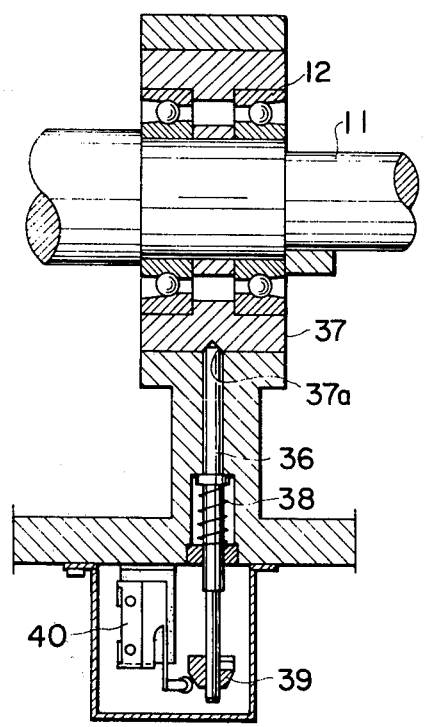

If the feed shaft 11 is displaced along the length thereof due to the aforesaid impact, then the bearing housing 37 will be displaced either to the left or to the right as viewed in FIG. 3. As a result, the rod 36 is depressed against the action of the spring 38, with its conical end depressed by means of the wall of the groove 37a, thereby actuating the limit switch 40 through the medium of the dog 39, so that the limit switch in turn stops the pulse motor 31 serving as a drive power source, with the resulting stoppage of the rotary feed mechanism of a machine tool.

The rotary feed mechanism including a worm and a worm wheel according to the present invention should not be construed in a limitative sense, but the present invention may be applied to feed mechanism using a rack and a pinion for effecting a linear motion. In short, any mechanism having a gear-meshing portion may be the subject of the application of the device according to the present invention.

As is apparent from the foregoing description of the overload protective device according to the present invention, various kinds of impacts being exerted on meshing gears may be effectively absorbed. In addition, the rotary feed mechanism itself may be stopped, thereby minimizing damages on the gear-meshing portion, coping with the increased forces resulting from increases in size of machine tools, for which an increasing demand is expected in the near future.

It will be understood that the above description is merely illustrative of the preferred embodiment of the invention. Additional modifications and improvements utilizing the discoveries of the present invention can be readily anticipated from the present disclosure by those skilled in the art, and such modifications and improvements may fairly be presumed to be within the scope and purview of the invention as defined by the claims that follow.

What is claimed is:

1. An impact absorbing, overload protective apparatus for use in protecting a motor driven rotatable member of a machine tool, the apparatus comprising:
   a. a housing having a generally tubular configuration;
   b. a piston slidably mounted within the housing the piston being engageable with the rotatable member for effecting said sliding motion of the piston in opposite directions from a predetermined axial position of said piston in said housing in response to undesirable axial forces on the rotatable member
   c. bearing structure in which the rotatable member journaled;
   d. at least the outer circumferential surface of the piston and the inner circumferential surface of the housing combining to define a pressure chamber having a configuration which varies with said sliding motion of said piston in said housing to absorb the energy of and yieldingly resist said axial forces exerted on said rotatable member tending to displace the piston in either direction from its said predetermined position; and,
d. a power interrupting apparatus including;
  i. a limit switch connected to the motor; and,
  ii. an element coupled between the limit switch and the rotatable member, said element being responsive to a predetermined amount of axial displacement of the rotatable member and the piston to actuate the limit switch to stop the motor driving the rotatable member.

2. The apparatus of claim 1, further comprising:
a. a thrust washer fitted concentrically on the rotatable member for engaging the piston in response to axial displacement of the rotatable member; and,
b. a second piston slidably mounted within the housing for movement in response to axial displacement of the rotatable member and being symmetrically disposed with respect to said piston about the axis and midplane of said thrust washer and at least partially defining a second pressure chamber symmetrically disposed with respect to said first chamber whose configuration varies with respect to the sliding displacement of the second piston.

3. The apparatus of claim 1, further comprising:
a hydraulic pressure supply system communicating with the interior of said chamber for maintaining fluid in said pressure chamber under pressure to assist in absorbing the energy of longitudinal forces exerted on the rotatable member.

4. The apparatus of claim 2, further comprising:
a hydraulic pressure supply system communicating with the interior of both of said chambers for maintaining fluid in said chamber under pressure to assist in absorbing the energy of longitudinal forces exerted on the rotatable member.

5. The apparatus of claim 1, said power interrupting apparatus further comprising:
a. a second bearing having a generally cylindrical housing defining a groove in its outer circumferential surface;
b. said element having one end engaged with said groove, the opposite end of said element being coupled to the rotatable member, such that the element is depressed in response to axial displacement of the rotatable member to actuate the limit switch to stop the operation of the motor.

* * * * *